US012595743B2

(12) United States Patent
Garin et al.

(10) Patent No.: US 12,595,743 B2
(45) Date of Patent: Apr. 7, 2026

(54) BLADED TURBOMACHINE ASSEMBLY INCLUDING MEANS FOR LIMITING VIBRATIONS BETWEEN PLATFORMS

(71) Applicants: SAFRAN AIRCRAFT ENGINES, Paris (FR); SAFRAN CERAMICS, Le Haillan (FR)

(72) Inventors: Fabrice Marcel Noël Garin, Moissy-Cramayel (FR); Romain Claude Gabriel Bardon, Moissy-Cramayel (FR); Fabrice Joël Luc Chevillot, Moissy-Cramayel (FR); Lucien Henri Jacques Quennehen, Moissy-Cramayel (FR); Simon Jean-Marie Bernard Cousseau, Moissy-Cramayel (FR)

(73) Assignees: SAFRAN AIRCRAFT ENGINES, Paris (FR); SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 18/869,432

(22) PCT Filed: Jun. 12, 2023

(86) PCT No.: PCT/FR2023/050847
§ 371 (c)(1),
(2) Date: Nov. 26, 2024

(87) PCT Pub. No.: WO2023/247856
PCT Pub. Date: Dec. 28, 2023

(65) Prior Publication Data
US 2025/0354495 A1 Nov. 20, 2025

(30) Foreign Application Priority Data
Jun. 22, 2022 (FR) ...................................... 2206148

(51) Int. Cl.
*F01D 5/22* (2006.01)

(52) U.S. Cl.
CPC ........ *F01D 5/225* (2013.01); *F05D 2220/323* (2013.01); *F05D 2240/80* (2013.01); *F05D 2260/96* (2013.01)

(58) Field of Classification Search
CPC ..... F01D 5/10; F01D 5/14; F01D 5/16; F01D 5/22; F01D 5/225; F01D 25/06;
(Continued)

(56) References Cited

U.S. PATENT DOCUMENTS 8,105,039 B1 * 1/2012 El-Aini .................. F01D 5/225 416/500
2005/0047917 A1 * 3/2005 Brock ..................... F01D 5/225 416/220 R (Continued)

FOREIGN PATENT DOCUMENTS

EP 1 512 838 A2 3/2005
EP 2 803 821 A1 11/2014

(Continued)

OTHER PUBLICATIONS

International Search Report issued Aug. 10, 2023 in PCT/FR2023/050847, filed on Jun. 12, 2023, 2 pages.

*Primary Examiner* — Elton K Wong
(74) *Attorney, Agent, or Firm* — Oblon, McClelland, Maier & Neustadt, L.L.P.

(57) ABSTRACT

A bladed turbomachine assembly including at least two adjacent blades, each blade including a radial aerofoil and a platform located at a free radial end of the aerofoil, the platform of each blade of the bladed assembly being located circumferentially facing a platform of the other circumferentially adjacent blade of the bladed assembly, the bladed assembly including an insert arranged circumferentially between the platforms and which cooperates with the plat- (Continued)

forms, each platform including a circumferential bearing face against which a circumferential end of the insert is in contact, and the direction of the contact between each circumferential bearing face and the insert being oriented circumferentially with respect to the main axis (A).

10 Claims, 6 Drawing Sheets

(58) Field of Classification Search
CPC ............. F01D 11/008; F05D 2220/323; F05D 2240/80; F05D 2260/96
See application file for complete search history.

(56) References Cited

U.S. PATENT DOCUMENTS

| | | | | |
|---|---|---|---|---|
| 2009/0016873 | A1* | 1/2009 | Bridges, Jr. | F01D 11/005 416/231 B |
| 2010/0202888 | A1* | 8/2010 | Miller | F01D 5/225 416/190 |
| 2014/0023506 | A1 | 1/2014 | Kleinow | |
| 2014/0079529 | A1* | 3/2014 | Kareff | F01D 5/22 415/119 |
| 2016/0108737 | A1* | 4/2016 | Batt | F01D 5/24 29/889.7 |

FOREIGN PATENT DOCUMENTS

| | | | |
|---|---|---|---|
| EP | 3 351 733 | A1 | 7/2018 |
| JP | 58-176402 | A | 10/1983 |
| JP | 6-221102 | A | 8/1994 |
| JP | 3933130 | B2 | 6/2007 |

* cited by examiner

BLADED TURBOMACHINE ASSEMBLY INCLUDING MEANS FOR LIMITING VIBRATIONS BETWEEN PLATFORMS

TECHNICAL FIELD

The invention relates to a bladed turbomachine assembly designed to carry out vibration damping of the outer radial ends of mobile blades by cooperating with one another.

The goal of the invention is to replace the existing solutions involving assembling the blades with a prestress upon mounting.

PRIOR ART

During the operation of a turbomachine, the blades, and more particularly the mobile blades, are subjected to various vibrations.

These vibrations are generally strongest at the outer radial end of each blade, commonly called “platform”.

To limit the amplitude of the vibrations at the platforms, it has been proposed to assemble the blades with a torsion prestress of the blades.

During the operation of the turbomachine, the prestress mentioned above, associated with a specific mounting, produces friction stresses allowing to reduce the amplitude of the vibrations.

This mounting involves specific shapes of the platforms of the blades, to interlock in a predefined manner.

However, because of the rotation of the blade in one direction or in the other, or a modification of the relative position of the platforms of the blades, the contact stress between the platforms can vary, which can hamper the damping of the vibrations.

Moreover, in the case of blades made of a CMC (ceramic matrix composite) material, this material does not allow to have torsion prestresses as great as other materials. Such prestresses induce strong static stresses that can go beyond those that the material can accept.

The goal of the invention is to propose a bladed turbomachine assembly that is designed to allow a damping of the vibrations by friction without having to prestress the blades upon mounting.

DISCLOSURE OF THE INVENTION

The invention proposes a bladed turbomachine assembly extending about a main axis A and including at least two circumferentially adjacent blades,

- each blade including an aerofoil extending according to a direction of radial extension with respect to said main axis A and a platform located at a free radial end of the aerofoil,
- wherein the platform of each blade of the bladed assembly is located circumferentially facing a platform of the other circumferentially adjacent blade of the bladed assembly,
- wherein the bladed assembly includes an insert arranged circumferentially between the platforms and which cooperates with the platforms,
- characterised in that each platform includes a circumferential bearing face against which a circumferential end of the insert is in contact,
- and in that the direction of the contact between each circumferential bearing face and the insert is oriented circumferentially with respect to the main axis A.

Preferably, at least one of the two platforms includes a groove circumferentially open towards the other of the two platforms, one face of the groove of which forms the circumferential bearing face and in which said groove a circumferential end of the insert is received.

Preferably, said circumferential bearing face is in the shape of an arc of a circle or is inclined with respect to the radial direction.

Preferably, the circumferential bearing face of a platform is parallel to a radial direction with respect to the main axis A.

Preferably, the circumferential bearing face includes a groove.

Preferably, the insert includes two contact faces, each contact face of which has a shape complementary to the shape of the bearing face that is associated with it.

Preferably, at least one contact face of the insert is in the shape of an arc of a cylinder, the axis of which is parallel to the main direction of the insert.

Preferably, each circumferential end of the insert is received with a radial play and a circumferential play in the groove that is associated with it.

Preferably, each platform includes a boss having a radial thickness greater than the thickness of the rest of the platform, in which said boss the groove is formed.

Preferably, the bladed assembly includes means for axial retention of the insert between the two platforms.

Preferably, the axial retention means comprise at least one finger carried by the insert which protrudes circumferentially from the insert and which is received in an associated notch formed circumferentially in recess in at least one of the platforms.

The invention also proposes an aircraft turbomachine including a bladed assembly according to the invention.

DETAILED DISCLOSURE OF THE INVENTION

The drawings show a part of a bladed turbomachine assembly 10 including two circumferentially adjacent blades 12. Preferably, the turbomachine including the bladed assembly 10 is an aircraft turbomachine.

Figure 8:
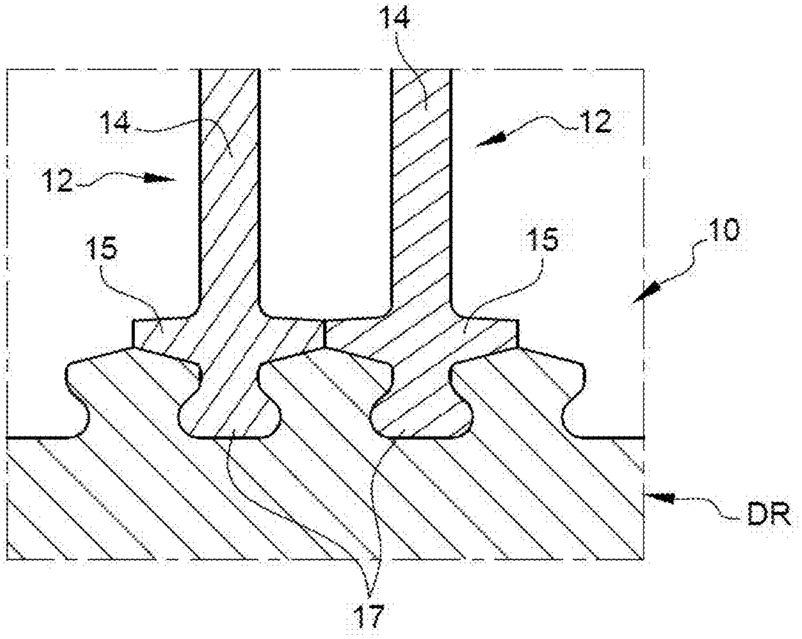
FIG. 8 is a partial view of a turbomachine rotor element equipped with a bladed assembly according to the invention.

This bladed assembly 10 is preferably a component belonging to a rotor disc of the turbomachine such as the rotor disc DR, a part of which is shown in FIG. 8. The blades

12 can thus be mounted by their roots in corresponding cells of this disc DR while forming a ring of blades 21*a*, 21*b* that surround the disc DR while being carried by the latter.

Here, and according to a non-limiting embodiment, the blades 12 are mobile blades of a low-pressure turbomachine turbine. It is understood that the invention is not limited to this embodiment and that it can also relate to mobile blades of other modules of the turbomachine or fixed blades.

The bladed assembly 10 has a main axis A that is intended to be the same as or coaxial to the main axis of the turbomachine when the bladed assembly 10 is mounted in the latter.

Each blade 12 includes an aerofoil 14 extending in a direction radial with respect to the main axis, a first radial end part 15 called root that is connected to a first radial end of the aerofoil 14 and a second radial end part 16 called platform, which is connected to a second radial end of the aerofoil 14.

Preferably, the platform 16 is connected to the free radial end of the aerofoil 14, that is to say the radial end of the aerofoil 14 that is not fastened to a rotary element for supporting the blades 12.

Thus, according to the embodiment shown in the drawings, the platform 16 is located at the outer radial end of the aerofoil 14. The inner radial end of the aerofoil 14 carrying the root 15 of the blade 12, by which the blade is mounted on the supporting element. As visible in FIG. 8 and as a preferred but non-limiting example, the root 15 of the blade 12 is mounted in a cell 17 of the disc of the rotor DR of the turbomachine.

The outer radial end of the blade 12, which is opposite to the root 15 for fastening the blade 12 to the rotor, further includes sealing strips (not shown).

The bladed assembly 10 shown in the drawings consists of two blades 12 that are circumferentially adjacent in the turbomachine.

In particular, the platforms 16 of the blades 12 are located near one another according to a circumferential direction.

Each platform 16 includes a lateral face 18 that is located circumferentially facing and at a distance from a lateral face 18 of the platform 16 of the circumferentially adjacent blade. Here, the two lateral faces 18 facing each other are parallel to one another and are inclined with respect to a plane passing through the main axis of the bladed assembly 10.

The bladed assembly 10 also includes an insert 20 that is arranged circumferentially between the platforms of the two circumferentially adjacent blades 12 and that cooperates with the two platforms 16 simultaneously, so that when vibrations are produced on the blades 12, friction occurs between the insert 20 and the platforms 16 to reduce the amplitude of the vibrational movements of the platforms 16.

Preferably, the insert 20 cooperates with the platforms 16 to reduce the vibrations.

For this purpose, each lateral face 18 of one of the two platforms 16 includes a bearing face 32 against which the insert 20 bears. Moreover, the bearing of the insert 20 on the bearing face 32 is oriented at least partly circumferentially with respect to the main axis A.

Thus, at least one bearing face 32 against which the insert 20 bears is inclined with respect to the radial direction.

For this, the lateral face 18 of at least one platform 16 includes a groove 22 receiving a circumferential end of the insert 20 that is associated with it. This groove 22 includes a face forming the bearing face 32 of the platform and it opens according to the circumferential direction in the direction of the platform 16 of the other blade 12.

The bearing face 32 is the radially outer face of the groove 22, which is oriented partly radially towards the inside, that is to say towards the main axis A, and partly circumferentially in the direction of the other platform 16.

Figure 1:
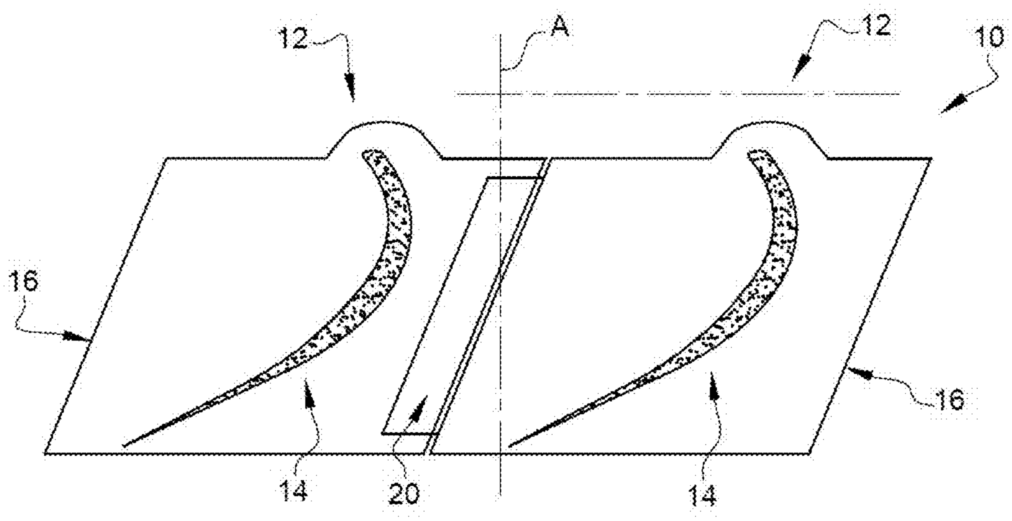
FIG. 1 is an end view of a bladed turbomachine assembly according to a direction radial with respect to a main axis of the bladed assembly.
Figure 2:
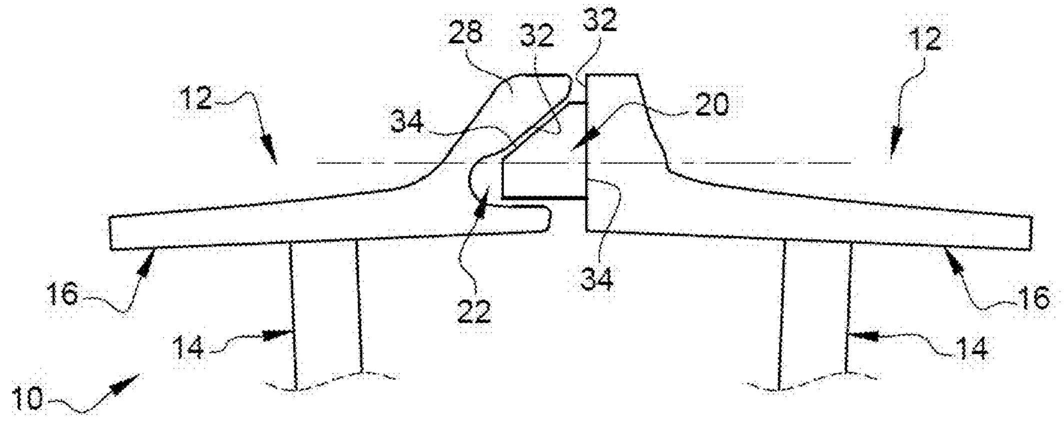
FIG. 2 is a cross-section of the bladed assembly shown in FIG. 1 according to a plane perpendicular to the main axis of the bladed assembly.
Figure 3:
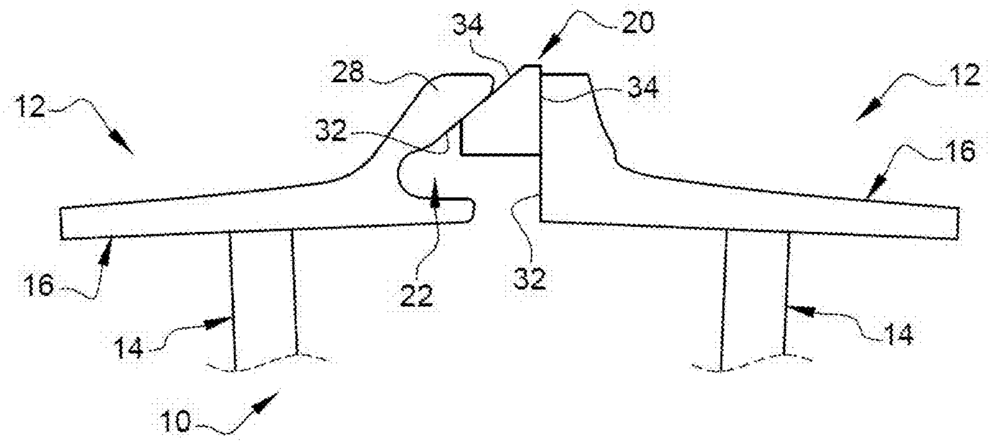
FIG. 3 is a view similar to that of FIG. 2, showing another relative position of the insert with respect to the platforms in the case of expansion of the latter.

According to a first embodiment shown in FIGS. 1 to 3, the bearing face 32 of one of the two platforms 16, here the right-hand platform 16, extends in a plane parallel to the radial direction. Thus, the bearing of the insert 20 against this bearing face 32 is oriented totally circumferentially with respect to the main axis A.

According to this first embodiment, only the bearing face 32 of the other platform 16, that is to say here the left-hand platform 16, includes a groove 22 including a bearing face 32.

Thus, according to this embodiment, the insert 20 is both compressed circumferentially between the two bearing faces 32 of the two platforms 16 and it bears radially towards the outside against the bearing face 32 of the left-hand platform, partly defining the groove 22.

During the operation of the turbomachine in which the bladed assembly 10 is arranged, the bearing of the insert 20 against the inclined bearing face 32 causes a bearing of the insert 20 against the other bearing face 32, which is oriented radially, according to the circumferential direction.

Via this circumferential bearing, friction stresses between the insert 20 and the bearing face 32 are produced, consequently reducing the vibrations of the two circumferentially adjacent platforms 16.

As visible in FIG. 3, the inclination of a bearing face also allows to compensate for the dimensional variations of the blades 12 caused by their expansion. During the expansion of the blades 12, the circumferentially adjacent platforms 16 move away circumferentially from one another. Since at least one bearing face 32 is inclined with respect to the radial direction, even if the platforms 16 move away circumferentially from one another, that is to say that the bearing faces 32 move away circumferentially from one another, the insert 20 moves radially with respect to the main axis A, while remaining in contact with the two bearing faces 32.

The function of damping the vibrations is thus preserved.

Figure 4:
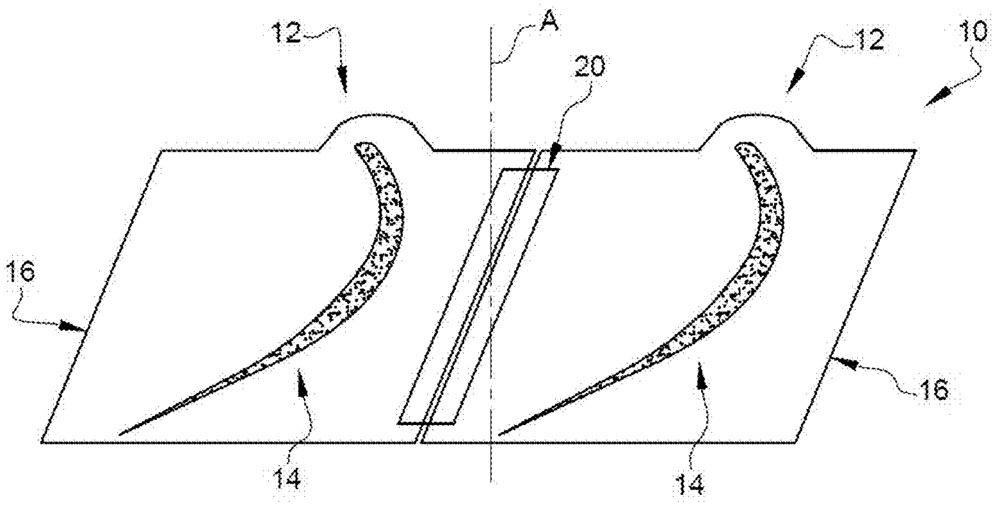
FIG. 4 is a view similar to that of FIG. 1, showing an alternative embodiment of the insert.
Figure 5:
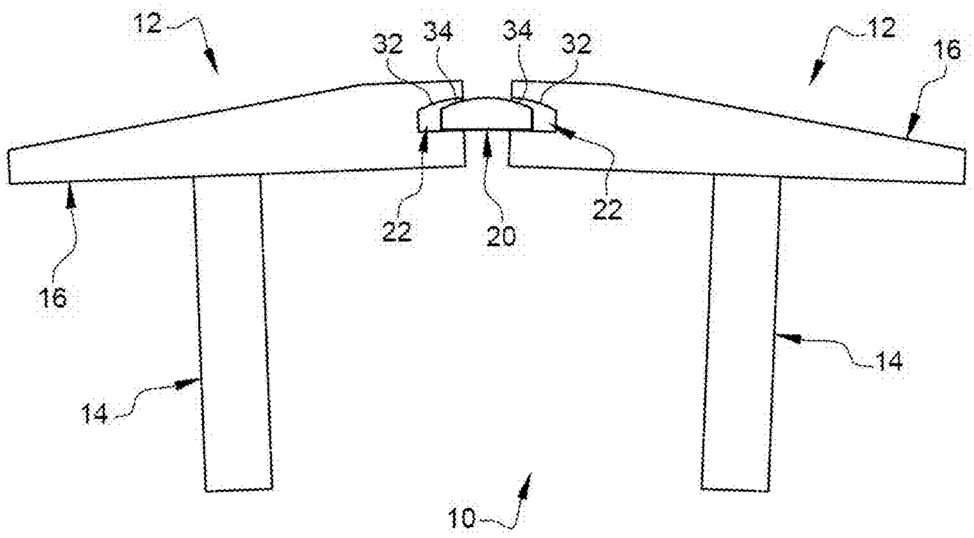
FIG. 5 is a view similar to that of FIG. 2, shown a cross-section of the bladed assembly shown in FIG. 4.

According to another embodiment shown in FIGS. 4 and 5, the lateral face 18 of each platform 16 includes a groove 22 receiving a circumferential end of the insert 20 that is associated with it. This groove 22 includes a face forming the bearing face 32 of the platform and it opens according to the circumferential direction in the direction of the platform 16 of the other blade 12.

The bearing face 32 is the radially outer face of the groove 22, which is oriented partly radially towards the inside, that is to say towards the main axis A, and partly circumferentially in the direction of the other platform 16.

The insert 20 includes contact faces 34 that are intended to bear against the bearing faces 32 of the platforms 16. Each contact face 34 has a shape complementary to the shape of the bearing face 32 that is associated with it. The contact face 34 and the bearing face 32 that is associated with it being disposed circumferentially facing one another.

Thus, according to the embodiment shown in FIGS. 1 and 2, a contact face 34 is oriented partly radially towards the outside, that is to say which moves away from the main axis A, and partly circumferentially in the direction of the platform 16 associated with the contact face 34. The other contact face 34 extends in a plane parallel to the radial direction so that the bearing of the insert 20 against the associated bearing face 32 is oriented totally circumferentially with respect to the main axis A.

According to the embodiment shown in FIGS. 4 and 5, each of the two contact faces 34 is oriented partly radially towards the outside, that is to say which moves away from the main axis A, and partly circumferentially in the direction of the platform 16 associated with the contact face 34.

Regardless of the embodiment, in order to allow a relative movement of the platforms 16 with respect to one another, in particular because of the expansion of the blades 12, the insert 20 is received with play in the groove 22 or the two grooves 22. Preferably, each circumferential end of the insert 20 is received with a radial play and a circumferential play in each of the two grooves 22.

For this, the radial dimension as well as the depth, measured circumferentially, of each groove 22 is greater than the radial thickness of the insert 20 and the circumferential length of the part of the insert that is received in each groove 22.

To compensate for this difference in expansions, and according to an alternative embodiment shown in FIG. 5, the contact face 34 of the insert 20 is curved radially towards the outside. Preferably, the contact face 34 of the insert 20 is in the shape of an arc of a cylinder, the axis of which is parallel to the substantially axial main direction of the insert 20.

In addition to this curved shape of the insert 20, the bearing face 32 of each groove 22 is also curved and in the shape of an arc of a cylinder, the axis of which is parallel to the substantially axial main direction of the lateral face 18.

Preferably, the radius of the cylinder associated with each bearing face 32 of a groove 22 is greater than the radius of the cylinder associated with the contact face 34 of the insert 20.

Via these convex shapes of the facing walls and faces, regardless of the deformation of one and/or the other of the blades 12 and the movement of their platforms 16, the contact between the insert 20 and each platform 16 is distributed in a cylinder-cylinder contact, that is to say a contact distributed over the entire length of the insert 20.

To receive each groove 22, a platform 16 includes a boss 28, that is to say a radial extra thickness. The consequence of this extra thickness is an increase in the mass of the platform 16. Thus, the greater the length of the insert 20, or of the associated grooves 22, the greater the mass of the platform 16 also.

Figure 6:
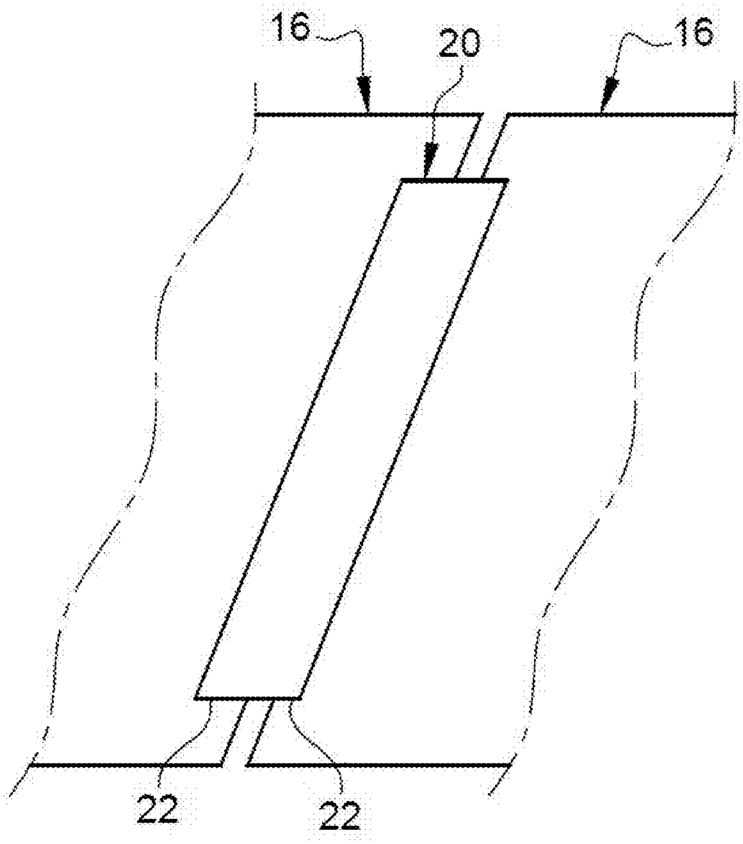
FIG. 6 is a cross-section of a bladed assembly taken according to a circumferential direction, showing a first embodiment of means for retaining the insert.
Figure 7:
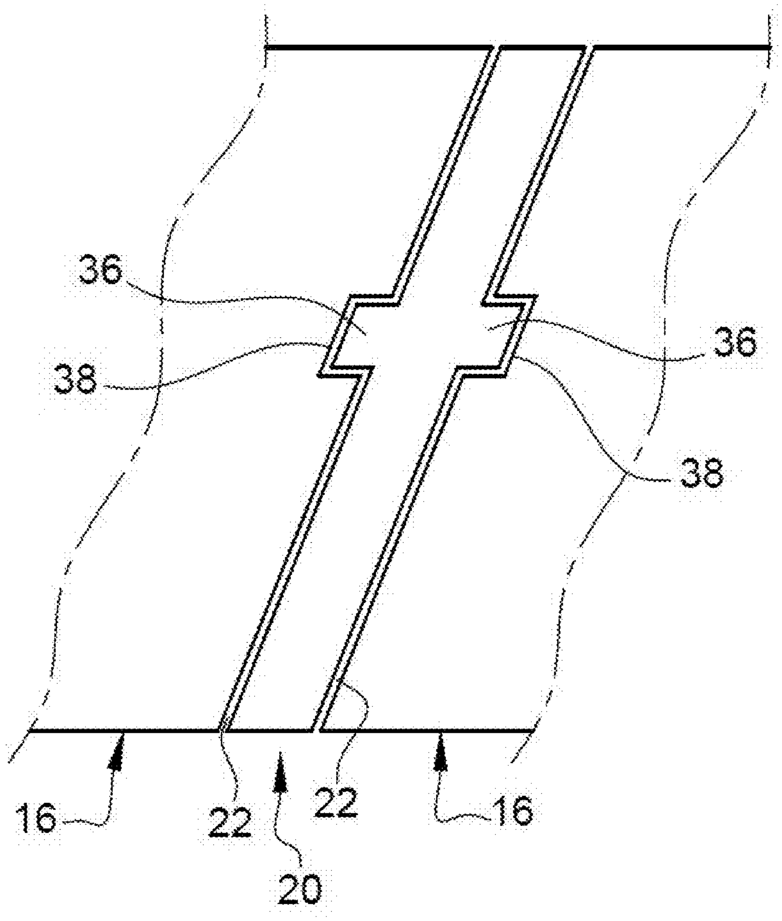
FIG. 7 is a cross-section similar to that of FIG. 6, showing another embodiment of the retaining means.

According to another aspect of the invention shown in FIGS. 6 and 7, the bladed assembly 10 includes means for axial retention of the insert 20 between the two platforms 16.

According to a first embodiment, the axial length of the insert 20 and of the groove 22 that is associated with it is less than the axial length of the platform 16 and the groove 22 does not open into each axial end of the platform 16. Thus, the insert 20 is capable of being axially stopped against an axial end of the groove 22 in which it is partly received.

According to a second embodiment shown in FIG. 7, these axial retention means consists of fingers 36 which protrude circumferentially with respect to the rest of the insert 20 and which are received in associated notches 38 formed in the platforms 16.

The fingers 36 and the notches 38 are designed to allow a relative movement of the insert 20 with respect to the platforms 16 according to the radial direction.

The platform 16 and the functional surfaces thereof, that is to say the boss 28, the lateral face 18 and the walls of the groove 22, are made of CMC, that is to say of Ceramic Matrix Composite, by weaving, moulding then optionally machining of the functional parts.

The insert 20 is for example made of a refractory metal material containing nickel or cobalt or of a monolithic or fibre-reinforced ceramic material. It is understood that the material forming the insert is not limited to these examples and that other materials can be used so as to adapt to the chosen use, in terms of resistance to temperature and reduction of mass while respecting the retention of the insert 20 and generating the desired level of damping.

The invention claimed is:

1. A bladed turbomachine assembly extending about a main axis and including at least two circumferentially adjacent blades, each blade comprising an airfoil extending according to a direction of radial extension with respect to said main axis and a platform located at a free radial end of the airfoil, wherein the platform of each blade of the bladed assembly is located circumferentially facing a platform of the other circumferentially adjacent blade of the bladed assembly, wherein the bladed assembly includes an insert arranged circumferentially between the platforms and which cooperates with the platforms, wherein each platform includes a circumferential bearing face against which a circumferential end of the insert is in contact, and the direction of the contact between each circumferential bearing face and the insert is oriented circumferentially with respect to the main axis, and wherein said bladed turbomachine assembly comprises means for axial retention of the insert between the two platforms that comprise at least one finger carried by the insert which protrudes circumferentially from the insert and which is received in an associated notch formed circumferentially in recess in at least one of the platforms, said at least one finger and the associated notch are designed to allow a relative movement of the insert with respect to the platforms according to the radial direction.

2. The bladed turbomachine assembly according to claim 1, wherein at least one of the two platforms includes a groove circumferentially open towards the other of the two platforms, one face of the groove of which forms the circumferential bearing face and in which said groove a circumferential end of the insert is received.

3. The bladed turbomachine assembly according to claim 1, wherein said circumferential bearing face is in the shape of an arc of a circle or is inclined with respect to the radial direction.

4. The bladed turbomachine assembly according to claim 1, wherein the circumferential bearing face of a platform is parallel to a radial direction with respect to the main axis.

5. The bladed turbomachine assembly according to claim 1, wherein the circumferential bearing face includes a groove.

6. The bladed turbomachine assembly according to claim 1, wherein the insert includes two contact faces, each contact face of which has a shape complementary to the shape of the circumferential bearing face.

7. The bladed turbomachine assembly according to claim 6, wherein at least one contact face of the insert is in the shape of an arc of a cylinder, an axis of which is parallel to the main direction of the insert.

8. The bladed turbomachine assembly according to claim 7, wherein each circumferential end of the insert is received with a radial play and a circumferential play in a groove.

9. The bladed turbomachine assembly according to claim 1, wherein each platform includes a boss having a radial thickness greater than a thickness of the rest of the platform, in which said boss a groove is formed.

10. An aircraft turbomachine including a bladed turbomachine assembly according to claim 1.

* * * * *